United States Patent
Hashimoto et al.

(10) Patent No.: US 11,235,781 B2
(45) Date of Patent: Feb. 1, 2022

(54) VEHICLE CONTROL SYSTEM, VEHICLE CONTROLLER, VEHICLE LEARNING DEVICE, VEHICLE CONTROL METHOD, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/068,874

(22) Filed: Oct. 13, 2020

(65) Prior Publication Data

US 2021/0114609 A1 Apr. 22, 2021

(30) Foreign Application Priority Data

Oct. 18, 2019 (JP) .............................. JP2019-191096

(51) Int. Cl.

| | |
|---|---|
| *G06F 1/00* | (2006.01) |
| *B60W 50/06* | (2006.01) |
| *F02D 41/00* | (2006.01) |
| *F02D 41/24* | (2006.01) |
| *F02D 41/28* | (2006.01) |
| *G07C 5/02* | (2006.01) |
| *G06N 20/00* | (2019.01) |
| *B60W 50/04* | (2006.01) |

(52) U.S. Cl.
CPC .......... *B60W 50/06* (2013.01); *B60W 50/045* (2013.01); *F02D 41/0002* (2013.01); *F02D 41/2464* (2013.01); *F02D 41/28* (2013.01); *G06N 20/00* (2019.01); *G07C 5/02* (2013.01); *B60W 2540/10* (2013.01); *F02D 2041/285* (2013.01)

(58) Field of Classification Search
CPC ... F02D 41/24; G05B 13/0255; G05B 13/047; G06K 9/6262; B60W 10/06
USPC .................................. 701/101, 115; 700/32
See application file for complete search history.

(56) References Cited

U.S. PATENT DOCUMENTS

| | | | |
|---|---|---|---|
| 6,549,815 B1 | 4/2003 | Kaji | |
| 2021/0114580 A1* | 4/2021 | Hashimoto | ....... B60W 50/0098 |
| 2021/0188276 A1* | 6/2021 | Hashimoto | ......... B60W 60/001 |
| 2021/0190204 A1* | 6/2021 | Hashimoto | ......... F16H 61/0213 |

(Continued)

FOREIGN PATENT DOCUMENTS

| | | |
|---|---|---|
| JP | 10-264505 A | 9/1998 |
| JP | 2000-260604 A | 9/2000 |

(Continued)

*Primary Examiner* — John Kwon
(74) *Attorney, Agent, or Firm* — Oblon, McClelland, Maier & Neustadt, L.L.P.

(57) ABSTRACT

A vehicle control system is provided. A classification process classifies vehicles into groups based on information related to vehicles. In order to update relationship defining data for each of the classified groups, an update process inputs, into an update map, states of the vehicles belonging to a same group, values of action variables used to operate the electronic devices of the vehicles belonging to the same group, and rewards corresponding to the operation of the electronic devices.

8 Claims, 4 Drawing Sheets

(56) References Cited

U.S. PATENT DOCUMENTS

2021/0213975 A1* 7/2021 Hashimoto ....... B60W 60/0051
2021/0229687 A1* 7/2021 Hashimoto ......... B60W 50/045

FOREIGN PATENT DOCUMENTS

| JP | 2016-6327 A | 1/2016 |
| JP | 2019-144748 A | 8/2019 |

* cited by examiner

Fig.1

VEHICLE CONTROL SYSTEM, VEHICLE CONTROLLER, VEHICLE LEARNING DEVICE, VEHICLE CONTROL METHOD, AND MEMORY MEDIUM

BACKGROUND

1. Field

The present disclosure relates to a vehicle control system, a vehicle controller, and a vehicle learning device.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter is required to set the operation amount of the throttle valve of the internal combustion engine mounted on the vehicle to an appropriate operation amount in accordance with the operation amount of the accelerator pedal. Thus, adaptation of the filter requires a great number of man-hours by skilled workers. In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1. A vehicle control system that includes a memory device, a first execution device, and a second execution device is provided. The memory device stores relationship defining data that defines a relationship between a state of a vehicle and an action variable related to an operation of an electronic device in the vehicle. The first execution device is mounted on the vehicle. The second execution device is an out-of-vehicle device. The first execution device and the second execution device are configured to cooperate to execute processes including: a state obtaining process that obtains a detection value of a sensor that detects the state of the vehicle; an operation process that operates the electronic device; a reward calculating process that provides, based on the detection value obtained by the state obtaining process, a greater reward when a characteristic of the vehicle meets a standard than when the characteristic of the vehicle does not meet the standard; an update process that updates the relationship defining data by inputting, to a predetermined update map, the state of the vehicle based on the detection value obtained by the state obtaining process, a value of the action variable used to operate the electronic device, and the reward corresponding to the operation of the electronic device; a vehicle information obtaining process that obtains information related to the vehicle; and a classification process that classifies vehicles that include the vehicle into groups based on the information related to the vehicle. The first execution device is configured to execute at least the state obtaining process and the operation process. The second execution device is configured to execute at least the update process, the vehicle information obtaining process, and the classification process. The operation process includes a process that operates the electronic device in accordance with the relationship defining data updated by the update process and the state of the vehicle. The update map is configured to output the updated relationship defining data so as to increase an expected return of the reward of a case in which the electronic device is operated in accordance with the relationship defining data. In order to update the relationship defining data for each of the classified groups, the second execution device is configured to execute the update process by inputting, into the update map, the states of the vehicles belonging to a same group, the values of the action variables used to operate the electronic devices of the vehicles belonging to the same group, and the rewards corresponding to the operation of the electronic devices.

This configuration calculates a reward that accompanies operation of the electronic device, so as to acquire the type of the reward obtained through that operation. Then, the relationship defining data is updated based on the reward, using the update map according to reinforcement learning. The relationship between the state of the vehicle and the action variable thus can be set to a value suitable for traveling of the vehicle. This reduces the man-hours required for skilled workers when the relationship between the state of the vehicle and the action variable is set to a value suitable for traveling of the vehicle.

The above-described configuration updates a single set of relationship defining data based on the states, the values of the action variables, and the rewards of multiple vehicles. This increases the frequency of update as compared to a case in which a single set of relationship defining data is updated based on the state, the value of the action variable, and the reward of a single vehicle.

The combination of the state of a vehicle and a suitable value of an action variable may vary depending on the travel environment of the vehicle, the degree of wear, and the preference of the user in regard to driving. Accordingly, the above-described configuration updates the relationship defining data for each of the groups of vehicles obtained through the classification process. Thus, as compared to a case in which a single set of relationship defining data is updated based on the states, the values of the action variables, and the rewards of all the vehicles each equipped with the first execution device in the system, the relationship defining data can be updated to more suitable data for each group.

Aspect 2. In the vehicle control system according to Aspect 1, the vehicle information obtaining process includes a process that obtains, as the information related to the vehicle, a degree-of-wear variable that indicates a degree of wear of the vehicle.

The responsiveness of the vehicle to a driving operation by the user varies depending on the degree of wear of the vehicle. Thus, the value of the action variable suitable for the state of the vehicle may differ depending on the degree of wear of the vehicle. Accordingly, the above-described configuration classifies the vehicle according to the degree of wear of the vehicle, so that the relationship defining data is updated to be suitable in accordance with the degree of wear of the vehicle.

Aspect 3. In the vehicle control system according to Aspect 1 or 2, the vehicle information obtaining process includes a process that obtains, as the information related to the vehicle, information related to an average of an amount of change per unit time of an accelerator operation amount.

The information related to the average of the amount of change per unit time of the accelerator operation amount may include information related to the preference of the user in regard to driving and information related to the degree of wear of the vehicle. Accordingly, the above-described configuration classifies the vehicle based on the information related to the average of the amount of change per unit time of the accelerator operation amount. Thus, the relationship defining data is updated to be suitable in accordance with the preference of the user in regard to driving and the degree of wear of the vehicle.

Aspect 4. In the vehicle control system according to anyone of Aspects 1 to 3, the vehicle information obtaining process includes a process that obtains, as the information related to the vehicle, positional information of the vehicle.

This configuration classifies the vehicle based on the positional information of the vehicle. The vehicle is thus classified while factoring in differences in the environment in which the vehicle is in and differences in the preference of the user in regard to driving.

Aspect 5. A vehicle controller is provided that includes the first execution device in the vehicle control system according to any one of Aspects 1 to 4.

Aspect 6. A vehicle learning device is provided that includes the second execution device in the vehicle control system according to any one of Aspects 1 to 4.

Aspect 7. A vehicle control method is provided that performs the various processes described in each of the above Aspects.

Aspect 8. A non-transitory computer readable memory medium is provided that stores a program that causes various devices to perform the various processes described in each of the above Aspects.

Other features and aspects will be apparent from the following detailed description, the drawings, and the claims.

BRIEF DESCRIPTION OF THE DRAWINGS

FIG. 1 is a diagram showing the configuration of a vehicle control system according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2:
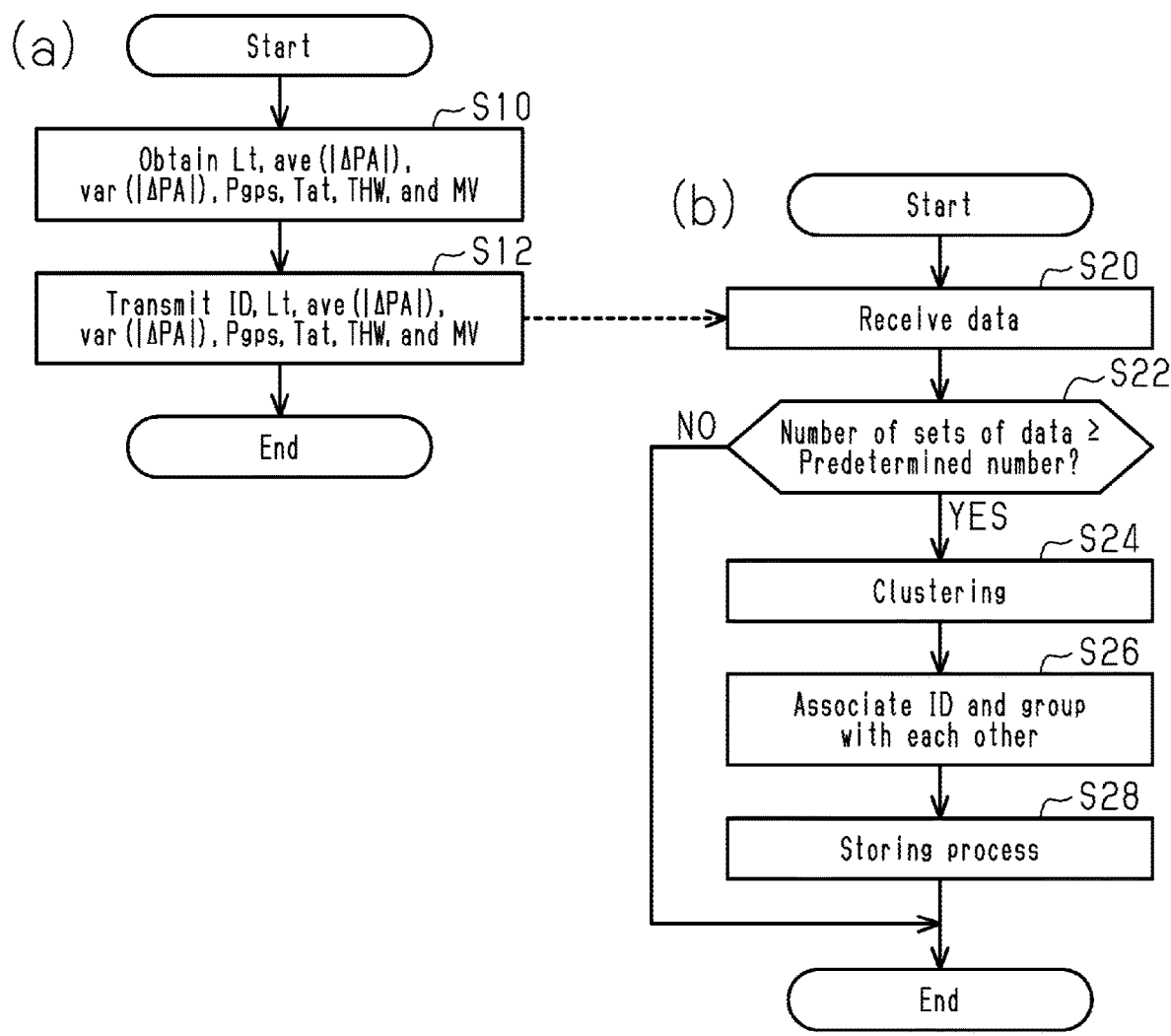
FIG. 2 includes sections (a) and (b), which are flowcharts showing procedures of processes executed by the system of the embodiment.

This description provides a comprehensive understanding of the methods, apparatuses, and/or systems described. Modifications and equivalents of the methods, apparatuses, and/or systems are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control system according to an embodiment will now be described with reference to FIGS. 1 to 4.

Figure 1:
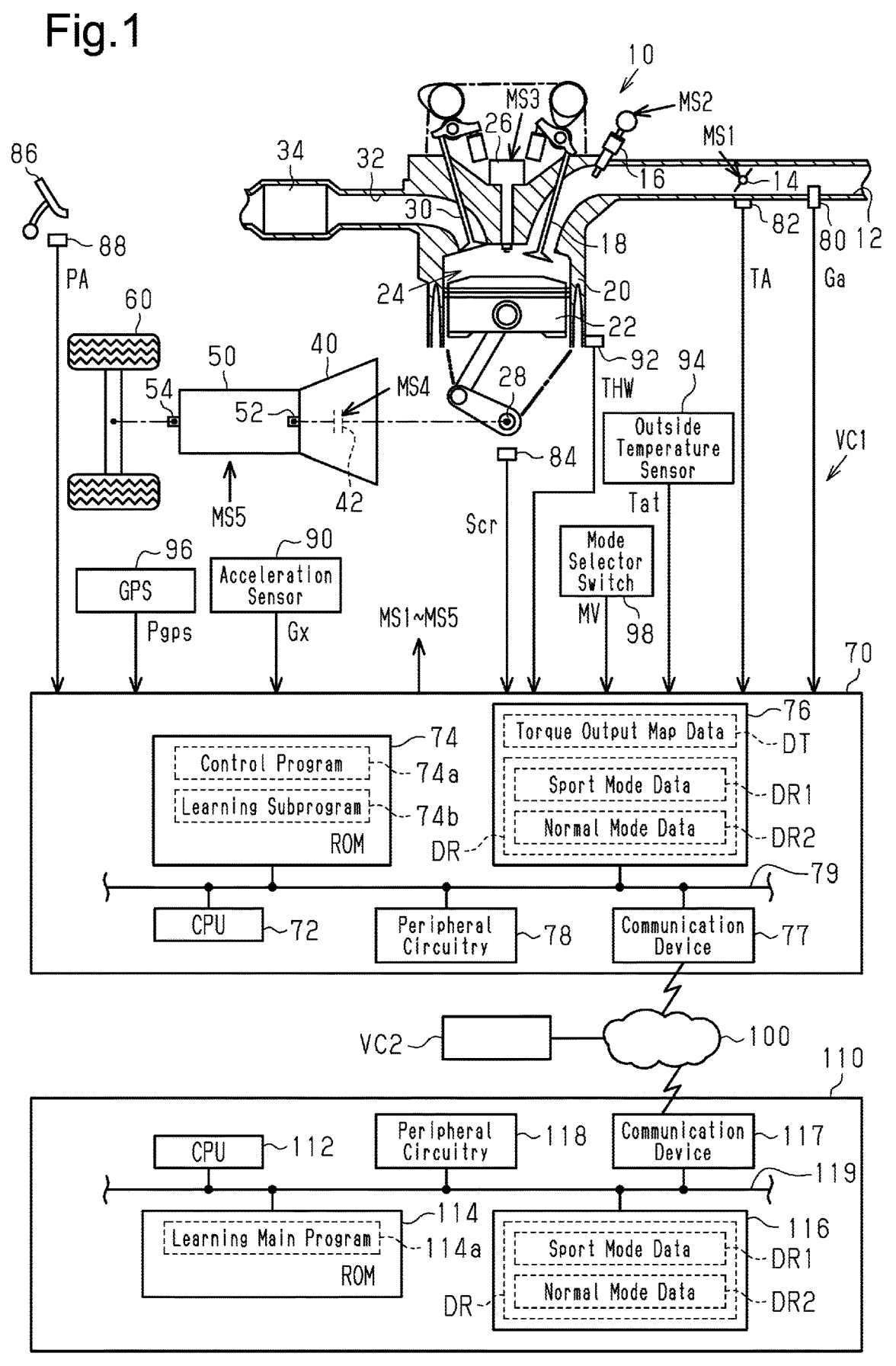

FIG. 1 shows the configuration of a drive system of a vehicle VC1 and the control system according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. The air-fuel mixture is burned by spark discharge of an ignition device 26 in the combustion chamber 24, and the energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 variably sets the gear ratio, which is the ratio of the rotation speed of the input shaft 52 and the rotation speed of an output shaft 54. The output shaft 54 is mechanically coupled to driven wheels 60.

The controller 70 controls the internal combustion engine 10 and operates operated units of the engine 10 such as the throttle valve 14, the fuel injection valve 16, and the ignition device 26, thereby controlling the torque and the ratios of exhaust components, which are controlled variables of the internal combustion engine 10. The controller 70 also controls the torque converter 40 and operates the lockup clutch 42 to control the engagement state of the lockup clutch 42. Further, the controller 70 controls and operates the transmission 50, thereby controlling the gear ratio, which is the controlled variable of the transmission 50. FIG. 1 shows operation signals MS1 to MS respectively corresponding to the throttle valve 14, the fuel injection valve 16, the ignition device 26, the lockup clutch 42, and the transmission 50.

To control the controlled variables, the controller 70 refers to an intake air amount Ga detected by an air flow meter 80, an opening degree of the throttle valve 14 detected by a throttle sensor 82 (throttle opening degree TA), and an output signal Scr of a crank angle sensor 84. The controller 70 also refers to a depression amount of an accelerator pedal 86 (accelerator operation amount PA) detected by an accelerator sensor 88, an acceleration Gx in the front-rear direction of the vehicle VC1 detected by an acceleration sensor 90, a temperature of coolant of the internal combustion engine 10 detected by a coolant temperature sensor 92 (coolant temperature THW), and an outside temperature Tat detected by an outside temperature sensor 94. The controller 70 further refers to positional data Pgps obtained by a global positioning system (GPS 96). The controller 70 also refers to a value of a mode variable MV, which is set by operation of a mode selector switch 98. The mode selector switch 98 is a human-machine interface that allows the user of the vehicle VC1 to select one of two options regarding the drive control modes of the vehicle VC1. The two drive control modes are a sport mode and a normal mode having different response performance of the vehicle VC1 to driving operation of the user. That is, the response performance of the sport mode is set to be higher than the response performance of the normal mode.

The controller 70 includes a CPU 72, a ROM 74, a nonvolatile memory that can be electrically rewritten (memory device 76), a communication device 77, and peripheral circuitry 78, which can communicate with one another through a local network 79. The peripheral circuitry 78 includes a circuit that generates a clock signal regulating internal operations, a power supply circuit, and a reset circuit.

The ROM 74 stores a control program 74a and a learning subprogram 74b. The memory device 76 stores relationship defining data DR, which defines the relationship of the accelerator operation amount PA with a command value of the throttle opening degree TA (throttle command value TA*) and a retardation amount aop of the ignition device 26. The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. Specifically, the relationship defining data DR includes sport mode data DR1 and normal mode data DR2. The memory device 76 also stores torque output map data DT. The torque output map data DT defines a torque output map. A rotation speed NE of the crankshaft 28, a charging efficiency η, and the ignition timing are input to the torque output map, which in turn outputs a torque Trq of the internal combustion engine 10.

The communication device 77 communicates with a data analysis center 110 via a network 100 outside the vehicle VC1.

The data analysis center 110 analyzes data transmitted from vehicles VC1, VC2, . . . . The data analysis center 110 includes a CPU 112, a ROM 114, a nonvolatile memory that can be electrically rewritten (memory device 116), peripheral circuitry 118, and a communication device 117, which can communicate with each other through a local network 119. The ROM 114 stores a learning main program 114a for updating the relationship defining data DR through reinforcement learning. The memory device 116 also stores the relationship defining data DR.

FIG. 2 shows a procedure of processes executed by the control system of the present embodiment. The processes shown in a section (a) of FIG. 2 are implemented by the CPU 72 executing the learning subprogram 74b stored in the ROM 74 shown in FIG. 1. Also, the process shown in a section (b) of FIG. 2 is implemented by the CPU 112 executing the learning main program 114a stored in the ROM 114. In the following description, the number of each step is represented by the letter S followed by a numeral. The processes shown in FIG. 2 will now be described according to the temporal sequence.

The amount of change per unit time of the accelerator operation amount PA is represented by $\Delta PA$. The average within a predetermined period of the absolute value of the amount of change per unit time $\Delta PA$ is represented by ave ($|\Delta PA|$). The variance of the absolute value of the amount of change per unit time $\Delta PA$ is represented by var ($|\Delta PA|$). As shown in the section (a) of FIG. 2, the CPU 72 first obtains a traveled distance Lt, the average ave ($|\Delta PA|$), the variance var ($|\Delta PA|$), the positional data Pgps, the outside temperature Tat, the coolant temperature THW, and the mode variable MV (S10). Next, the CPU 72 controls the communication device 77 to transmit the obtained data, together with identification information ID of the vehicle VC1, to the data analysis center 110 (S12). When the process of step S12 is completed, the CPU 72 temporarily suspends the series of processes shown in the section (a) of FIG. 2.

As shown in the section (b) of FIG. 2, the CPU 112 receives the data transmitted through the process of S12 and stores the data in the memory device 116 (S20). The CPU 112 determines whether the total number of sets of data that have been transmitted from the multiple vehicles VC1, VC2, . . . and stored in the memory device 116 is greater than or equal to a predetermined number (S22). When determining that the total number of sets of data stored in the memory device 116 is greater than or equal to the predetermined number, the CPU 112 classifies the vehicles that have transmitted the data into several groups through clustering, which is unsupervised learning, based on the stored data (S24). In the present embodiment, K-means clustering is used for the classification.

That is, the CPU 72 first normalizes the values of variables included in the received sets of data as necessary. For example, the CPU 72 simply needs to set, to the same scale, the differences between the maximum values and the minimum values of the traveled distance Lt, the average ave ($|\Delta PA|$), the variance var ($|\Delta PA|$), the positional data Pgps, the outside temperature Tat, the coolant temperature THW, and the mode variable MV.

Next, the CPU 112 receives labels data vectors the number of which is greater than or equal to a predetermined number so that the data vectors are distinguishable from each other. The data vectors are seven-dimensional vectors each including, as components, the normalized values of the traveled distance Lt, the average ave ($|\Delta PA|$), the variance var ($|\Delta PA|$), the positional data Pgps, the outside temperature Tat, the coolant temperature THW, and the mode variable MV, which are received in the process of S20. Subsequently, the CPU 72 sets the number of the groups to K, and sets the initial values of the average values of the K seven-dimensional vectors indicating the averages of the data vectors belonging to the respective groups, as necessary. K is a predetermined integer greater than 1.

Next, the CPU 112 multiplies the squared value of the difference between each data vector and the corresponding average vector by a binary indicator variable rnk, which only has a value of 0 or 1. The CPU 112 then calculates the sum total of the obtained products, the number of which is greater than or equal to a predetermined number, and all the groups, and defines the calculated sum total as a strain scale J. The letters n and k of the indicator variable rnk are indexes. The variable n is the label variable of the data vector, and the variable k is the label variable of the group.

To minimize the strain scale J, the CPU 112 repeats, until the strain scale J converges, an E-step, in which the CPU 112 fixes the average vector and updates the indicator variable rnk, and an M-step, in which the CPU 112 fixes the indicator variable rnk and updates the average vector.

Then, based on an indicator variable rij, which has a value of 1 when the strain scale J is minimized, the CPU 112 assumes that the data vector specified by the variable 1 belongs to the group specified by the variable j.

The CPU 112 then identifies which of a first group to a Kth group the vehicle identified by the identification information ID corresponds to (S26). If the data vectors that are formed by data sets transmitted from a single vehicle belong to different groups, the CPU 112 simply needs to associate that vehicle with a group to which the greatest number of the data vectors belong.

Next, the CPU 112 associates the identification information ID of the vehicle and the group with each other and stores these in the memory device 116 (S28).

When completing the process of S28 or when making a negative determination in the process of S22, the CPU 112 temporarily suspends the series of processes shown in the section (b) of FIG. 2.

Figure 3:
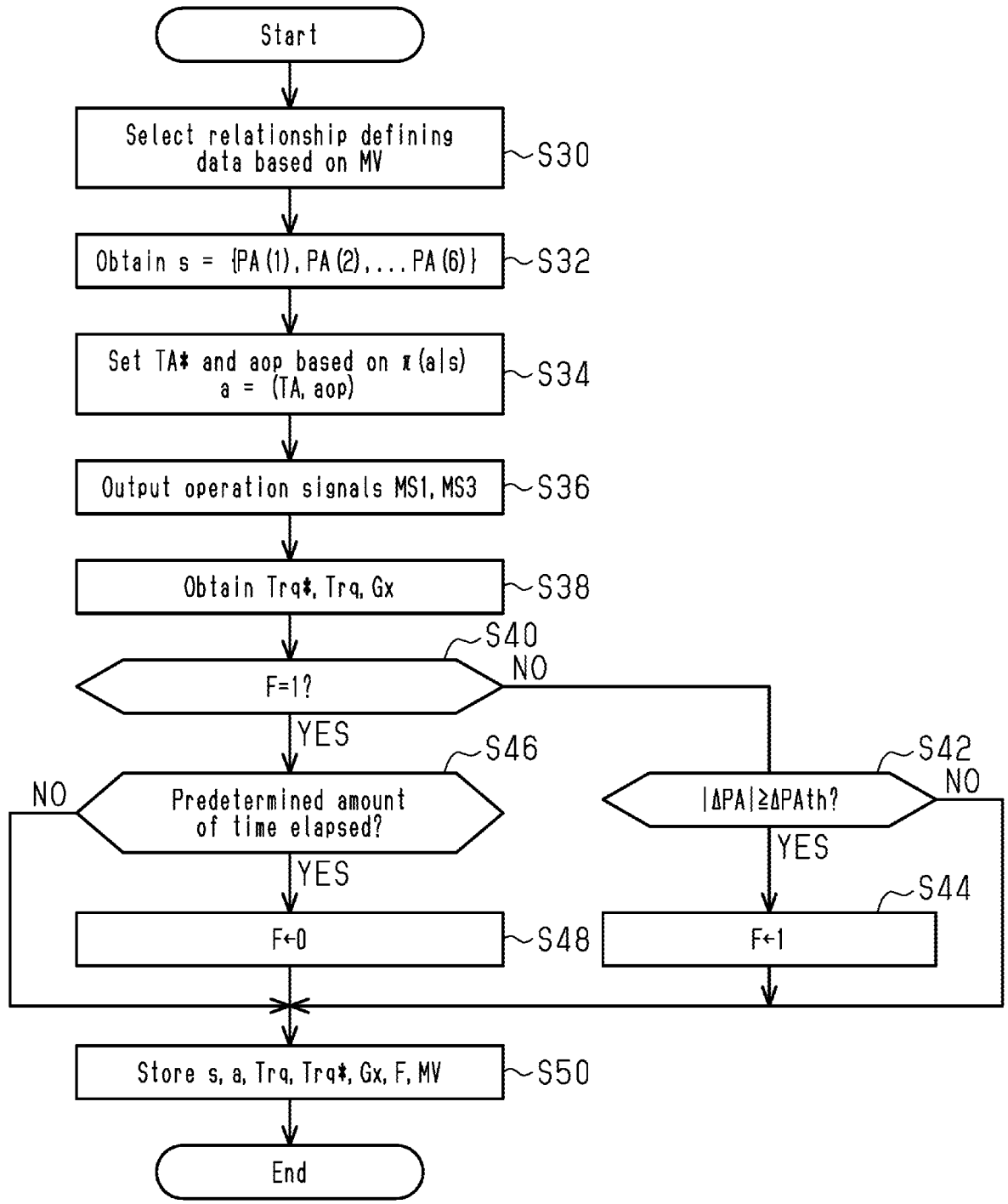
FIG. 3 is a flowchart showing a procedure of processes executed by the controller according to the first embodiment.

FIG. 3 shows a procedure of processes executed by the controller 70 of the present embodiment. The processes shown in FIG. 3 are implemented by the CPU 72 repeatedly executing the control program 74a stored in the ROM 74, for example, at predetermined intervals.

In the series of processes shown in FIG. 3, the CPU 72 selects the relationship defining data DR, which will be used in the process of S34 below, based on the mode variable MV (S30). That is, when the sport mode is selected, the CPU 72 selects the sport mode data DR1. When the normal mode is selected, the CPU 72 selects the normal mode data DR2. The CPU 72 acquires, as a state s, time-series data that includes six sampled values PA(1), PA(2), . . . PA(6) (S32). The sampled values included in the time-series data have been sampled at different points in time. In the present embodiment, the time-series data includes six sampled values that are consecutive in time in a case in which the values are sampled at a constant sample period.

Next, in accordance with a policy π defined by the relationship defining data DR, the CPU 72 sets an action a, which includes the throttle command value TA* and the retardation amount aop corresponding to the state s obtained through the process of S32 (S34).

In the present embodiment, the relationship defining data DR is used to define an action value function Q and the policy π. In the present embodiment, the action value function Q is a table-type function representing values of expected return in accordance with eight-dimensional independent variables of the state s and the action a. When a state s is provided, the action value function Q includes values of the action a at which the independent variable is the provided states. Among these values, the one at which the expected return is maximized is referred to as a greedy action. The policy π defines rules with which the greedy action is preferentially selected, and an action a different from the greedy action is selected with a predetermined probability.

Next, the CPU 72 outputs the operation signal MS1 to the throttle valve 14 based on the set throttle command value TA* and retardation amount aop, thereby controlling the throttle opening degree TA, and outputs the operation signal MS3 to the ignition device 26, thereby controlling the ignition timing (S36). The present embodiment illustrates an example in which the throttle opening degree TA is feedback-controlled to the throttle command value TA*. Thus, even if the throttle command value TA* remains the same value, the operation signals MS1 may have different values. For example, when a known knock control system (KCS) is operating, the value obtained by retarding the reference ignition timing by the retardation amount aop is used as the value of the ignition timing corrected through feedback correction in the KCS. The reference ignition timing is varied by the CPU 72 in correspondence with the rotation speed NE of the crankshaft 28 and the charging efficiency η. The rotation speed NE is calculated by the CPU 72 based on the output signal Scr of the crank angle sensor 84. The charging efficiency η is calculated by the CPU 72 based on the rotation speed NE and the intake air amount Ga.

The CPU 72 obtains the torque Trq of the internal combustion engine 10, a torque command value Trq*, and the acceleration Gx (S38). The CPU 72 calculates the torque Trq by inputting the rotation speed NE and the charging efficiency η to the torque output map. The CPU 72 sets the torque command value Trq* in accordance with the accelerator operation amount PA.

Next, the CPU 72 determines whether a transient flag F is 1 (S40). The value 1 of the transient flag F indicates that a transient operation is being performed, and the value 0 of the transient flag F indicates that the transient operation is not being performed. When determining that the transient flag F is 0 (S40: NO), the CPU 72 determines whether the absolute value of a change amount per unit time ΔPA of the accelerator operation amount PA is greater than or equal to a predetermined amount ΔPAth (S42). The change amount per unit time ΔPA simply needs to be the difference between the latest accelerator operation amount PA at the point in time of execution of S42 and the accelerator operation amount PA of the point in time that precedes the execution of S42 by a certain amount of time.

When determining that the absolute value of the change amount per unit time ΔPA is greater than or equal to the predetermined amount ΔPAth (S42: YES), the CPU 72 assigns 1 to the transient flag F (S44).

In contrast, when determining that the transient flag F is 1 (S40: YES), the CPU 72 determines a predetermined amount of time has elapsed from the point in time of execution of the process of S44 (S46). The predetermined amount of time is an amount of time during which the absolute value of the change amount per unit time ΔPA of the accelerator operation amount PA remains less than or equal to a specified amount that is less than the predetermined amount ΔPAth. When determining that the predetermined amount of time has elapsed (S46: YES), the CPU 72 assigns 0 to the transient flag F (S48).

When the processes of S44, S48 are completed or when the determinations are negative in the processes of S42, S46, the CPU 72 stores the following data in the memory device 76 (S50). That is, the CPU 72 stores, in the memory device 76, the mode variable MV, which was used in the process of S30, the state s, which was obtained through the process of S32, the action a, which was selected through the process of S34, the torque Trq, which was obtained through the process of S38, the torque command value Trq*, the value of the acceleration Gx, and the value of the transient flag F.

When the process of step S50 is completed, the CPU 72 temporarily suspends the series of processes shown in FIG. 3.

Figure 4:
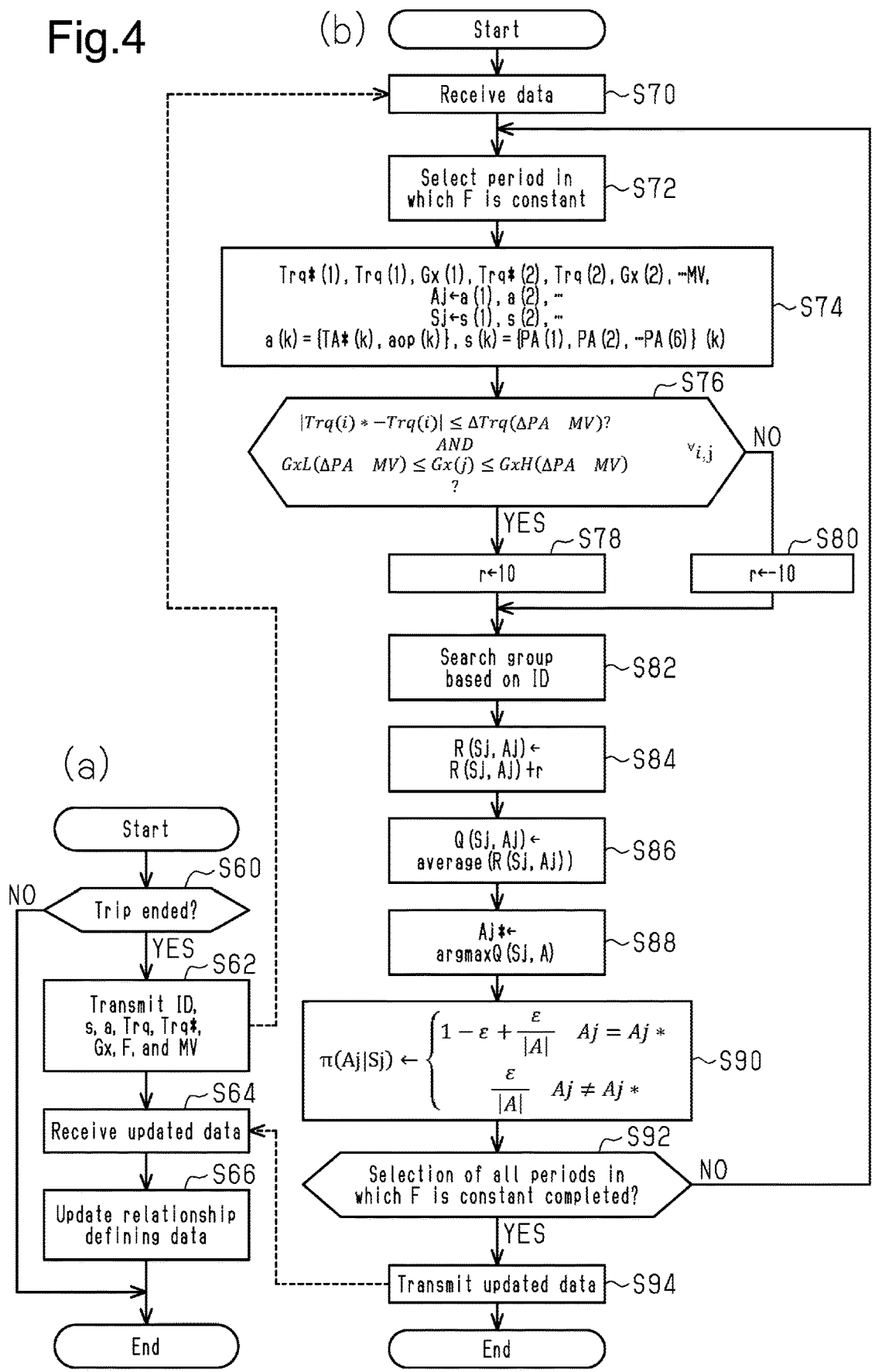
FIG. 4 includes sections (a) and (b), which are flowcharts showing procedures of processes executed by the system of the embodiment.

FIG. 4 shows a procedure of processes of reinforcement learning according to the present embodiment. The processes shown in a section (a) of FIG. 4 are implemented by the CPU 72 executing the learning subprogram 74b stored in the ROM 74 shown in FIG. 1. Also, the process shown in a section (b) of FIG. 4 is implemented by the CPU 112 executing the learning main program 114a stored in the ROM 114. The processes shown in FIG. 4 will now be described according to the temporal sequence.

In the series of processes shown in the section (a) of FIG. 4, the CPU 72 first determines whether a trip has now ended (S60). A "trip" refers to a single period during which a driving permission signal of the vehicle is ON. In the present embodiment, the driving permission signal corresponds to an ignition signal.

When determining that a trip has now ended (S60: YES), the CPU 72 operates the communication device 77 to transmit the identification information ID of the vehicle VC1 and the data stored through the process of S50 (S62).

On the other hand, as shown in the section (b) of FIG. 4, the CPU 112 receives the data transmitted through the process of S62 (S70). From the received data, the CPU 112 selects one period in which the transient flag F is constant. That is, the CPU 112 selects one episode (S72). Each episode refers to a period from when the process of S48 is executed to when the process of S44 is executed or the period from when the process of S44 is executed to when the process of S48 is executed.

Next, the CPU 112 acquires time-series data that includes groups of sampled values of the torque command value Trq*, the torque Trq, and the acceleration Gx in the selected episode, and time-series data of the state s and the action a (S74). In FIG. 4, variables of which the numbers in parentheses are different are variables at different sampling points in time. For example, a torque command value Trq*(1) and a torque command value Trq*(2) have been obtained at different sampling points in time. The time-series data of the action a belonging to the selected episode is defined as an action set Aj, and the time-series data of the state s belonging to the same episode is defined as a state set Sj.

Next, the CPU 112 determines whether the logical conjunction of the following conditions (A) and (B) is true: the condition (A) is that the absolute value of the difference between an arbitrary torque Trq belonging to the selected episode and the torque command value Trq* is less than or equal to a specified amount ΔTrq; and the condition (B) is that the acceleration Gx is greater than or equal to a lower limit GxL and less than or equal to an upper limit GxH (S72).

The CPU 112 varies the specified amount ΔTrq depending on the change amount per unit time ΔPA of the accelerator operation amount PA and the mode variable MV at the start of the episode. That is, when determining that the episode is related to transient time based on the change amount per unit time ΔPA at the start of the episode, the CPU 112 sets the specified amount ΔTrq to a greater value than in a case in which the episode is related to steady time. Also, the CPU 112 sets the specified amount ΔTrq to a smaller value in the sport mode than in the normal mode.

The CPU 112 also varies the lower limit GxL depending on the change amount per unit time ΔPA of the accelerator operation amount PA and the mode variable MV at the start of the episode. That is, when the episode is related to transient time and the change amount per unit time ΔPA has a positive value, the CPU 112 sets the lower limit GxL to a greater value than in a case in which the episode is related to steady time. When the episode is related to transient time and the change amount per unit time ΔPA has a negative value, the CPU 112 sets the lower limit GxL to a smaller value than in a case in which the episode is related to steady time. Also, when the change amount per unit time ΔPA has a positive value, the CPU 112 sets the lower limit GxL to a greater value in the sport mode than in the normal mode. When the change amount per unit time ΔPA has a negative value, the CPU 112 sets the lower limit GxL to a smaller value in the sport mode than in the normal mode.

The CPU 112 also varies the upper limit GxH depending on the change amount per unit time ΔPA of the accelerator operation amount PA and the mode variable MV at the start of the episode. That is, when the episode is related to transient time and the change amount per unit time ΔPA has a positive value, the CPU 112 sets the upper limit GxH to a greater value than in a case in which the episode is related to steady time. When the episode is related to transient time and the change amount per unit time ΔPA has a negative value, the CPU 112 sets the upper limit GxH to a smaller value than in a case in which the episode is related to steady time. Also, when the change amount per unit time ΔPA has a positive value, the CPU 112 sets the upper limit GxH to a greater value in the sport mode than in the normal mode. When the change amount per unit time ΔPA has a negative value, the CPU 112 sets the upper limit GxH to a smaller value in the sport mode than in the normal mode.

When determining that the logical disjunction is true (S76: YES), the CPU 112 assigns 10 to the reward r (S78). When determining that the logical conjunction is false (S76: NO), the CPU 112 assigns −10 to the reward r (S80). When the processes of S78 and S80 are completed, the CPU 112 performs a search to determine which of the groups the vehicle VC1 belongs to based on the identification information ID obtained through the process of S70 (S82).

The CPU 112 updates the relationship defining data DR common to the identified groups. In the present embodiment, the relationship defining data DR is updated by the e-soft on-policy Monte Carlo method.

That is, the CPU 112 adds the reward r to respective returns R(Sj, Aj), which are determined by pairs of the states obtained through the process of S74 and actions corresponding to the respective states (S84). R(Sj, Aj) collectively represents the returns R each having one of the elements of the state set Sj as the state and one of the elements of the action set Aj as the action. Next, the CPU 112 averages each of the returns R(Sj, Aj), which are determined by pairs of the states and the corresponding actions obtained through the process of S84, and assigns the averaged returns R(Sj, Aj) to the corresponding action value functions Q(Sj, Aj)(S86). The averaging process for the return R simply needs to be a process of dividing the return R, which is calculated through the process of S84, by a number obtained by adding a predetermined number to the number of times the process S84 has been executed. The initial value of the return R simply needs to be set to the initial value of the corresponding action value function Q at the time of shipment of the vehicle VC1.

Next, for each of the states obtained through the process of S74, the CPU 112 assigns, to an action Aj*, an action that is the combination of the throttle command value TA* and the retardation amount aop when the corresponding action value function Q(Sj, A) has the maximum value (S88). The symbol A represents an arbitrary action that can be taken. The action Aj* can have different values depending on the type of the state obtained through the process of S74. However, in view of simplification, the action Aj* has the same symbol regardless of the type of the state in the present description.

Next, the CPU 112 updates the policy π (Aj|Sj) corresponding to each of the states obtained through the process of S84 (S90). That is, the CPU 112 sets the selection probability of the action Aj* selected through S88 to 1−ε+ε/|A|, where |A| represents the total number of actions. The number of the actions other than the action Aj* is represented by |A|−1. The CPU 112 sets the selection probability of each of the actions other than the action Aj* to ε/|A|. The process of S90 is based on the action value function Q, which has been updated through the process of S86. Accordingly, the relationship defining data DR, which defines the relationship between the state s and the action a, is updated to increase the return R.

Next, the CPU 112 determines whether the processes of S72 to S90 have been completed for all the episodes belonging to the data of one trip that has been received through the process of S70. When determining that there are episodes for which the processes of S72 to S90 have not been completed (S92: NO), the CPU 112 returns the process of S72.

When determining that the processes of S72 to S90 have been completed for all the episodes (S92: YES), the CPU 112 operates the communication device 117 to transmit the updated relationship defining data DR to the source of transmission of the data that has been received through the process of S70. When the process of step S94 is completed, the CPU 112 temporarily suspends the series of processes shown in the section (b) of FIG. 4.

In contrast, as shown in the section (a) of FIG. 4, the CPU 72 receives the updated relationship defining data DR (S64), and rewrites the relationship defining data DR used in the process of S34 with the received relationship defining data DR (S66). When completing the process of S66 or when making a negative determination in the process of S60, the CPU 72 temporarily suspends the series of processes shown in the section (a) of FIG. 4.

The relationship defining data DR that is stored in the memory device 76 at the shipment of the vehicle VC1 is a learned model in which reinforcement learning has been performed to some extent through processes according to FIGS. 3 and 4, for example, by simulating traveling of the vehicle on the test bench. However, in the learning prior to the shipment, some of the all combinations of the state s and the action a, which are independent variables of the action value function Q, are deleted based on human knowledge and the like. For example, in time-series data of the accelerator operation amount PA, human operation of the accelerator pedal 86 would never create a situation in which one of two consecutive values is the minimum value of the accelerator operation amount PA and the other is the maximum value. Accordingly, the action value function Q is not defined for the learning prior to the shipment. In the present embodiment, only in the learning prior to the shipment, reduction of the dimensions based on human knowledge limits the number of the possible values of the state s, which is defined by the action value function Q, to a number less than or equal to 10 to the fourth power, and preferably, to a number less than or equal to 10 to the third power.

The operation and advantages of the present embodiment will now be described. The CPU 72 obtains time-series data of the accelerator operation amount PA, which is the state s, as the user operates the accelerator pedal 86, and sets the action a, which includes the throttle command value TA* and the retardation amount aop, according to the policy π. Basically, the CPU 72 selects the action a that maximizes the expected return, based on the action value function Q defined by the relationship defining data DR. However, the CPU 72 searches for the action a that maximizes the expected return by selecting, with the predetermined probability a, actions other than the action a that maximizes the expected return. The CPU 72 transmits the state s, the action a, the torque Trq, the torque command value Trq*, and the acceleration Gx to the data analysis center 110.

This allows the data analysis center 110 to update the relationship defining data DR through reinforcement learning as the user drives the vehicle VC1. Thus, the throttle command value TA* corresponding to the accelerator operation amount PA and the retardation amount aop can be set to appropriate values for driving of the vehicle VC1 without excessively increasing the man-hours by skilled workers. Particularly, the CPU 112 updates a single set of the relationship defining data DR based on the data transmitted from multiple vehicles. This increases the frequency of update of the relationship defining data DR as compared to a case in which a single set of the relationship defining data DR is updated based on the data transmitted, for example, from a single vehicle.

Instead of updating the relationship defining data DR using all the sets of data transmitted from the vehicles VC1, VC2, . . . , the CPU 112 updates each set of the relationship defining data DR for each of the groups of vehicles that have been classified through clustering.

The classification of the present embodiment is expected to be a classification according to the degree of wear of vehicles. That is, the degree of wear of the vehicle is assumed to be greater when the traveled distance Lt is long than when the traveled distance Lt is short. When the degree of wear of the vehicle is great, deposit has accumulated on the intake passage 12 and the throttle valve 14 of the internal combustion engine 10, so that the cross-sectional flow area of the intake passage 12 in relation to the throttle command value TA* is reduced. This diminishes the acceleration feel. The user is thus expected to change the operation of the accelerator pedal 86 to compensate for the diminished acceleration. The compensating operation by the user can be captured by using the average ave (|ΔPA|) and the variance var (|ΔPA|).

Thus, according to the above described classification, the relationship of the accelerator operation amount PA with the throttle command value TA* and the retardation amount aop can be learned appropriately in accordance with the degree of wear of the vehicle.

The present embodiment described above further has the following operational advantages.

(1) The elements of the data set for the clustering include the positional data Pgps. The operation of the accelerator pedal 86 may vary due to factors other than the degree of wear of the vehicle. For example, regional differences of the properties of fuel or the way the user drives may contribute to variation of the accelerator pedal operation. Vehicles can be classified taking these factors into consideration.

(2) The elements of the data set for the clustering include the outside temperature Tat and the coolant temperature THW. The operation of the accelerator pedal 86 may vary due to factors other than the degree of wear of the vehicle. For example, the influence of the air density on the charging efficiency η may contribute to variation of the accelerator pedal operation. Vehicles can be classified taking this factor into consideration.

(3) The elements of the data set for the clustering include the mode variable MV. The operation of the accelerator pedal 86 may vary due to factors other than the degree of wear of the vehicle. For example, variation in the preference of the users in regard to driving may contribute to variation of the accelerator pedal operation. Vehicles can be classified taking this factor into consideration.

(4) Prior to the shipment, reinforcement learning is performed only for some of the values of the independent variables of the action value function Q. Learning of the action value function Q can be performed for all the values of the independent variables as the vehicle VC1 is driven after the shipment. Thus, based on a large quantity of data transmitted from the vehicles VC1, VC2, . . . , the reinforcement learning enables learning of the action value function Q that includes an independent variable of which the number of dimensions is so great that learning prior to the shipment is impossible.

(5) The independent variables of the action value function Q include time-series data of the accelerator operation amount PA. The value of the action a thus can be finely adjusted in response to various changes in the accelerator operation amount PA, as compared to a case in which a single sampled value is used as the independent variable regarding the accelerator operation amount PA.

(6) The independent variables of the action value function Q include the throttle command value TA*. This increases the degree of flexibility of the search performed by reinforcement learning as compared to a case in which a parameter of a model equation that models the behavior of the throttle command value TA* is used as an independent variable related to the throttle opening degree.

<Correspondence>

The correspondence between the items in the above exemplary embodiments and the items described in the above SUMMARY is as follows. Below, the correspondence is shown for each of the numbers in the examples described in the above SUMMARY.

Regarding Aspects 1, 4, 5, and 6, the electronic device corresponds to the throttle valve 14 and the ignition device 26. The first execution device corresponds to the CPU 72 and the ROM 74, and the second execution device corresponds to the CPU 112 and the ROM 114. The memory device corresponds to the memory devices 76, 116. The state obtaining process corresponds to the processes S32 and S38. The operation process corresponds to the process of S36. The reward calculating process corresponds to the processes of S76 to S80. The update process corresponds to the processes of S84 to S90. The update map corresponds to the map defined by the processes of S84 to S90, which are defined by the learning main program 114*a*. The vehicle information obtaining process corresponds to the processes S10 and S20. The classification process corresponds to the process of S24.

Regarding Aspect 2, the degree of wear is quantified by the traveled distance Lt.

Regarding Aspect 3, the information related to the average of the amount of change per unit time of the accelerator operation amount corresponds to the average ave (|ΔPA|).

Other Embodiments

The present embodiment may be modified as follows. The above-described embodiment and the following modifications can be combined as long as the combined modifications remain technically consistent with each other.

Regarding Vehicle Information Obtaining Process

In the above-described embodiment, the set of the group data of the traveled distance Lt, the average ave (|ΔPA|), the variance var (|ΔPA|), the positional data Pgps, the outside temperature Tat, the coolant temperature THW, and the mode variable MV is obtained as the object of clustering and is used as information related to the vehicle. The group data may be generated by using only two, three, four, five, or six of these seven variables. Alternatively, only one of the seven variables may be subjected to the clustering. Instead of using the average or the variance in a predetermined period of the absolute value of the change amount per unit time ΔPA of the accelerator operation amount PA, it is possible to use the average or the variance only of a case in which the change amount per unit time ΔPA of the accelerator operation amount PA has a positive value.

The group data included in the data set subjected to the clustering may include the average of the accelerator operation amount PA in a predetermined period. Also, the group data may include, for example, the average of the throttle opening degree TA in a predetermined period or the average of the throttle command value TA* in a predetermined period. Further, the group data may include, for example, the average or the variance in a predetermined period of the absolute value of the amount of change per unit time of the throttle opening degree TA, or the average or the variance in a predetermined period of the absolute value of the throttle command value TA*.

Regarding Classification Process

In the above-described embodiment, the K-means clustering is performed through a batch process, but the K-means clustering may be performed through online learning.

In the above-described embodiment, the number of groups is specified in advance, and the clustering is performed based on the K-means clustering. The present disclosure is not limited to this. For example, it is possible to determine which clustering result is selected after the K-means clustering is performed by setting the number of groups for each of different values. This selecting process may calculate, for each state, the sum of the values of the action value function Q related to actions of which the absolute value of the difference between the action and the value of the action value function Q related to the greedy action is less than or equal to a predetermined value. Then, all the sums are combined for all the states belonging to each group to obtain the sum total for each group. A variable that defines a group of which the sum total is great simply needs to be used as a variable that significantly influences the greedy action.

However, the K-means clustering does not necessarily need to be used. For example, in place of the squared value of the difference between the average vector and the data vector, a Gauss distribution may be used in which a data vector that is defined by an average vector and a covariance matrix is used as an independent variable. A mixture Gaussian distribution may be generated by using a mixing coefficient $\pi k$ in place of the indicator variable rnk, and the generated mixture Gaussian distribution may be used as a marginal distribution of the data vector. In this case, the average vector, the covariance matrix, and the mixing coefficient $\pi k$ are learned through maximum likelihood estimation, and the data vector simply needs to be determined to belong to the group that corresponds to the greatest one of the responsibilities corresponding to the respective mixing coefficients $\pi 1$ to $\pi k$.

The clustering may be performed by including the data learned through reinforcement learning in the group data included in the data set subjected to the clustering. Specifically, the group data may include groups of the action value function Q, the states, and the action a. This can be implemented, for example, as follows.

(i) In the data analysis center 110, vehicles are classified according to the respective variables obtained through the process of S10, and the action value function Q is updated for variable in each group.

(ii) If a variable causes the updated greedy action to vary significantly between the groups, that variable is defined as a variable that significantly influences the greedy action. If a variable causes the updated greedy action to vary insignificantly, that variable is defined as a variable that insignificantly influences the greedy action.

(iii) The clustering is performed by using the greedy action and the variable that significantly influences the greedy action. The thus generated group is defined by the values of one or more variables that significantly influence the greedy action. Thus, the ultimate group simply needs to be defined according to only these one or more variables.

Regarding Action Variable

In the above-described embodiments, the throttle command value TA* is used as an example of the variable related to the opening degree of a throttle valve, which is an action variable. However, the present disclosure is not limited to this. For example, the responsivity of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

In the above-described embodiments, the retardation amount aop is used as the variable related to the ignition timing, which is an action variable. However, the present disclosure is not limited to this. For example, the ignition timing, which is corrected by a KCS, may be used as the variable related to the ignition timing.

In the above-described embodiments, the variable related to the opening degree of the throttle valve and the variable related to the ignition timing are used as examples of action variables. However, the present disclosure is not limited to this. For example, the variable related to the opening degree of the throttle valve and the variable related to the ignition timing may be replaced by the fuel injection amount. With regard to these three variables, only the variable related to the opening degree of the throttle valve or the fuel injection amount may be used as the action variable. Alternatively, only the variable related to the ignition timing and the fuel injection amount may be used as the action variables. Only one of the three variables may be used as the action variable.

As described in the Regarding Internal Combustion Engine section below, in the case of a compression ignition internal combustion engine, a variable related to an injection amount simply needs to be used in place of the variable related to the opening degree of the throttle valve, and a variable related to the injection timing may be used in place of the variable related to the ignition timing. In addition to the variable related to the injection timing, it is preferable to use a variable related to the number of times of injection within a single combustion cycle and a variable related to the time interval between the ending point in time of one fuel injection and the starting point in time of the subsequent fuel injection for a single cylinder within a single combustion cycle.

For example, in a case in which the transmission 50 is a multi-speed transmission, the action variable may be the value of the current supplied to the solenoid valve that adjusts the engagement of the clutch using hydraulic pressure.

For example, as described the Regarding Vehicle section below, when a hybrid vehicle, an electric vehicle, or a fuel cell vehicle is used as the vehicle, the action variable may include the torque or the output of the rotating electric machine. Further, when the present disclosure is employed in a vehicle equipped with an air conditioner that includes a compressor, and the compressor is driven by the rotational force of the engine crankshaft, the action variable may include the load torque of the compressor. When the present disclosure is employed in a vehicle equipped with a motor-driven air conditioner, the action variables may include the power consumption of the air conditioner.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

After the shipment of the vehicle, it is not necessary to expand the range of the possible values of the independent variable of the action value function Q, which is subjected to reinforcement learning, as compared to that prior to the shipment. Further, reinforcement learning does not necessarily need to be performed prior to the shipment. For example, the vehicle may be shipped after the initial value of the action value function Q is set by using adaptation data of another vehicle that has an internal combustion engine of the same displacement, and in which the action variable has already been adapted for the action. In this case, reinforcement learning may be performed for the first time after the shipment.

Regarding Relationship Defining Data

In the above-described embodiments, the action value function Q is a table-type function. However, the present disclosure is not limited to this. For example, a function approximator may be used.

For example, instead of using the action value function Q, the policy π may be expressed by a function approximator that uses the state s and the action a as independent variables and uses the probability that the action a will be taken as a dependent variable. In this case, parameters defining the function approximator may be updated in accordance with the reward r.

Regarding Operation Process

For example, when using a function approximator as the action value function Q as described in the Regarding Relationship Defining Data section above, all the groups of discrete values related to actions that are independent variables of the table-type function of the above-described embodiments simply need to be input to the action value function Q together with the state s, so as to select the action a that maximizes the action value function Q.

For example, when the policy π is a function approximator that uses the state s and the action a as independent variables, and uses the probability that the action a will be taken as a dependent variable as in the Regarding Relationship Defining Data section above, the action a simply needs to be selected based on the probability indicated by the policy π.

Regarding Update Map

The r-soft on-policy Monte Carlo method is executed in the process of S84 to S90. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy π is expressed using a function approximator, and the function approximator is directly updated based on the reward r, the update map is preferably constructed using, for example, a policy gradient method.

The present disclosure is not limited to the configuration in which only one of the action value function Q and the policy π is directly updated using the reward r. For example, the action value function Q and the policy π may be separately updated as in an actor critic method. In an actor critic method, the action value function Q and the policy π do not necessarily need to be updated. For example, in place of the action value function Q, a value function V may be updated.

Regarding Reward Calculating Process

In the process of S76 of FIG. 4, the reward is provided depending on whether the logical disjunction of the conditions (A) and (B) is true. However, the present disclosure is not limited to this. For example, it is possible to execute a process that provides the reward depending on whether the condition (A) is met and a process that provides the reward depending on whether the condition (B) is met. For example, it is possible to execute only one of a process that provides the reward depending on whether the condition (A) is met and a process that provides the reward depending on whether the condition (B) is met.

For example, instead of providing the same reward without exception when the condition (A) is met, a process may be executed in which a greater reward is provided when the absolute value of the difference between the torque Trq and the torque command value Trq* is small than when the absolute value is great. Also, instead of providing the same reward without exception when the condition (A) is not met, a process may be executed in which a smaller reward is provided when the absolute value of the difference between the torque Trq and the torque command value Trq* is great than when the absolute value is small.

For example, instead of providing the same reward without exception when the condition (B) is met, a process may be executed in which the reward is varied in accordance with the acceleration Gx. Also, instead of providing the same reward without exception when the condition (B) is not met, a process may be executed in which the reward is varied in accordance with the acceleration Gx.

In the above-described embodiment, the reward r is provided depending on whether the standard related to drivability is met. The standard related to drivability is not limited to the one described above. For example, the reward r may be provided depending on whether noise or vibration intensity meets a standard. Further, the reward r may be provided when any one of the following four conditions is met: whether the acceleration meets a standard; whether the following performance of the torque Trq meets a standard; whether the noise meets a standard; and whether the vibration intensity meets a standard.

The reward calculating process is not limited to the process that provides the reward r depending whether the standard related to drivability is met. The reward calculating process may be a process that provides a greater reward, for example, when the fuel consumption rate meets a standard than when the fuel consumption rate does not meet the standard. Further, the reward calculating process may be a process that provides a greater reward, for example, when the exhaust characteristic meets a standard than when the exhaust characteristic does not meet the standard. The reward calculating process may include two or three of the following processes: the process that provides a greater reward when the standard related to drivability is met than when the standard is not met; the process that provides a greater reward when the energy use efficiency meets the standard than when the energy use efficiency does not meet the standard; and the process that provides a greater reward when the exhaust characteristic meets the standard than when the exhaust characteristic does not meet the standard.

For example, when the current value of the solenoid valve of the transmission 50 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the transmission input shaft 52 is less than or equal to an input-side predetermined value than when the absolute value exceeds the input-side predetermined value.

(c) A process that provides a greater reward when the absolute value of the rate of change of the rotation speed of the transmission output shaft 54 is less than or equal to an output-side predetermined value than when the absolute value exceeds the output-side predetermined value.

Also, when the torque or the output of the rotating electric machine is used as the action variable as described in the Regarding Action Variable section above, the reward calculating process may include the following processes: a process that provides a greater reward when the state of charge of the battery is within a predetermined range than when the state of charge is out of the predetermined range; and a process that provides a greater reward when the temperature of the battery is within a predetermined range than when the temperature is out of the predetermined range. Further, when the action variable includes the load torque of the compressor or the power consumption of the air conditioner as described in the Regarding Action Variable section above, the reward calculating process may include the following process: a process that provides a greater reward when the temperature in the passenger compartment is within a predetermined range than when the temperature is out of the predetermined range.

Regarding Vehicle Control System

The vehicle control system does not necessarily include the controller 70 and the data analysis center 110. Also, the vehicle control system may include the controller 70, a portable terminal, and the data analysis center 110. This configuration is achieved, for example, by the portable terminal executing the process of S34.

Regarding Execution Device

The execution device is not limited to the device that includes the CPU 72 (112) and the ROM 74 (114) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Memory Device

In the above-described embodiments, the memory device storing the relationship defining data DR and the memory device (ROM 74) storing the learning subprogram 74b and the control program 74a are separate from each other. However, the present disclosure is not limited to this. In the above-described embodiments, the memory device storing the relationship defining data DR and the memory device (ROM 114) storing the learning main program 114a are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include a port injection valve and a direct injection valve.

The internal combustion engine is not limited to a spark-ignition engine, but may be a compression ignition engine that uses, for example, light oil or the like.

Regarding Vehicle

The vehicle is not limited to a vehicle that includes only an internal combustion engine as a propelling force generator, but may be a hybrid vehicle includes an internal combustion engine and a rotating electric machine. Further, the vehicle may be an electric vehicle or a fuel cell vehicle that includes a rotating electric machine as the propelling force generator, but does not include an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle control system, comprising:
a memory device;
a first execution device; and
a second execution device, wherein
the memory device stores relationship defining data that defines a relationship between a state of a vehicle and an action variable related to an operation of an electronic device in the vehicle,
the first execution device is mounted on the vehicle,
the second execution device is an out-of-vehicle device,
the first execution device and the second execution device are configured to cooperate to execute processes including:
a state obtaining process that obtains a detection value of a sensor that detects the state of the vehicle,
an operation process that operates the electronic device,
a reward calculating process that provides, based on the detection value obtained by the state obtaining process, a greater reward when a characteristic of the vehicle meets a standard than when the characteristic of the vehicle does not meet the standard,
an update process that updates the relationship defining data by inputting, to a predetermined update map, the state of the vehicle based on the detection value obtained by the state obtaining process, a value of the action variable used to operate the electronic device, and the reward corresponding to the operation of the electronic device,
a vehicle information obtaining process that obtains information related to the vehicle, and
a classification process that classifies vehicles that include the vehicle into groups based on the information related to the vehicle,
the first execution device is configured to execute at least the state obtaining process and the operation process,
the second execution device is configured to execute at least the update process, the vehicle information obtaining process, and the classification process,
the operation process includes a process that operates the electronic device in accordance with the relationship defining data updated by the update process and the state of the vehicle,
the update map is configured to output the updated relationship defining data so as to increase an expected return of the reward of a case in which the electronic device is operated in accordance with the relationship defining data, and
in order to update the relationship defining data for each of the classified groups, the second execution device is configured to execute the update process by inputting, into the update map, the states of the vehicles belonging to a same group, the values of the action variables used to operate the electronic devices of the vehicles belonging to the same group, and the rewards corresponding to the operation of the electronic devices.

2. The vehicle control system according to claim 1, wherein the vehicle information obtaining process includes a process that obtains, as the information related to the vehicle, a degree-of-wear variable that indicates a degree of wear of the vehicle.

3. The vehicle control system according to claim 1, wherein the vehicle information obtaining process includes a process that obtains, as the information related to the vehicle, information related to an average of an amount of change per unit time of an accelerator operation amount.

4. The vehicle control system according to claim 1, wherein the vehicle information obtaining process includes a process that obtains, as the information related to the vehicle, positional information of the vehicle.

5. A vehicle controller, comprising the vehicle control system according to claim 1.

6. A vehicle learning device, comprising the vehicle control system according to claim 1.

7. A vehicle control method that is performed by a memory device, a first execution device, and a second execution device, the first execution device being mounted on a vehicle, and the second execution device being an out-of-vehicle device, the vehicle control method comprising:

using the memory device to store relationship defining data that defines a relationship between a state of a vehicle and an action variable related to an operation of an electronic device in the vehicle;

causing the first execution device and the second execution device to cooperate to:
  obtain a detection value of a sensor that detects the state of the vehicle,
  operate the electronic device,
  based on the obtained detection value, provide a greater reward when a characteristic of the vehicle meets a standard than when the characteristic of the vehicle does not meet the standard,
  update the relationship defining data by inputting, to a predetermined update map, the state of the vehicle based on the obtained detection value, a value of the action variable used to operate the electronic device, and the reward corresponding to the operation of the electronic device,
  obtain information related to the vehicle, and
  classify vehicles that include the vehicle into groups based on the information related to the vehicle, using the first execution device at least to obtain the detection value and operate the electronic device, using the second execution device at least to:
  update the relationship defining data,
  obtain information related to the vehicle, and
  classify the vehicles into the groups, wherein the operating the electronic device includes operating the electronic device in accordance with the updated relationship defining data and the state of the vehicle, the update map outputs the updated relationship defining data so as to increase an expected return of the reward of a case in which the electronic device is operated in accordance with the relationship defining data, and in order to update the relationship defining data for each of the classified groups, the relationship defining data is updated by the second execution device, which inputs, into the update map, the states of the vehicles belonging to a same group, the values of the action variables used to operate the electronic devices of the vehicles belonging to the same group, and the rewards corresponding to the operation of the electronic devices.

8. A non-transitory computer readable medium storing a program that causes a memory device, a first execution device, and a second execution device to execute a vehicle control process, the first execution device being mounted on a vehicle, and the second execution device being an out-of-vehicle device, the vehicle control process comprising:

using the memory device to store relationship defining data that defines a relationship between a state of a vehicle and an action variable related to an operation of an electronic device in the vehicle;

causing the first execution device and the second execution device to cooperate to obtain a detection value of a sensor that detects the state of the vehicle, operate the electronic device,
  based on the obtained detection value, provide a greater reward when a characteristic of the vehicle meets a standard than when the characteristic of the vehicle does not meet the standard,
  update the relationship defining data by inputting, to a predetermined update map, the state of the vehicle based on the obtained detection value, a value of the action variable used to operate the electronic device, and the reward corresponding to the operation of the electronic device,
  obtain information related to the vehicle, and
  classify vehicles that include the vehicle into groups based on the information related to the vehicle, using the first execution device at least to obtain the detection value and operate the electronic device, using the second execution device at least to:
  update the relationship defining data,
  obtain information related to the vehicle, and
  classify the vehicles into the groups, wherein the operating the electronic device includes operating the electronic device in accordance with the updated relationship defining data and the state of the vehicle, the update map outputs the updated relationship defining data so as to increase an expected return of the reward of a case in which the electronic device is operated in accordance with the relationship defining data, and in order to update the relationship defining data for each of the classified groups, the relationship defining data is updated by the second execution device, which inputs, into the update map, the states of the vehicles belonging to a same group, the values of the action variables used to operate the electronic devices of the vehicles belonging to the same group, and the rewards corresponding to the operation of the electronic devices.

\* \* \* \* \*